US011556658B2

(12) United States Patent
Schvey et al.

(10) Patent No.: US 11,556,658 B2
(45) Date of Patent: Jan. 17, 2023

(54) CROSS-PARTITION CALLS IN PARTITIONED, TAMPER-EVIDENT DATA STORES

(71) Applicant: Schvey, Inc., New York, NY (US)

(72) Inventors: Jeffrey Schvey, New York, NY (US); Abhaar Gupta, New York, NY (US); Fahad Riaz, New York, NY (US); George Rabanca, New York, NY (US)

(73) Assignee: Schvey, Inc., New York, NY (US)

( * ) Notice: Subject to any disclaimer, the term of this patent is extended or adjusted under 35 U.S.C. 154(b) by 114 days.

(21) Appl. No.: 17/110,013

(22) Filed: Dec. 2, 2020

(65) Prior Publication Data
US 2021/0165890 A1 Jun. 3, 2021

Related U.S. Application Data

(60) Provisional application No. 62/942,622, filed on Dec. 2, 2019.

(51) Int. Cl.
*G06F 21/60* (2013.01)
*H04L 9/32* (2006.01)
(Continued)

(52) U.S. Cl.
CPC ............ *G06F 21/602* (2013.01); *G06F 3/062* (2013.01); *G06F 3/0655* (2013.01);
(Continued)

(58) Field of Classification Search
CPC .... G06F 21/602; G06F 16/9024; G06F 3/062; G06F 3/0655; H04L 9/0643
(Continued)

(56) References Cited

U.S. PATENT DOCUMENTS 8,356,758 B1 * 1/2013 Cok .................. G06K 19/0717
235/492
10,248,678 B2 4/2019 Hildebrand
(Continued)

FOREIGN PATENT DOCUMENTS

WO 2016120826 A2 8/2016
WO 2018069566 A1 4/2018

OTHER PUBLICATIONS

Steven H. VanderLeest; Hypervisor: The Safe & Secure Future of Avionics; IEEE: 2015; pp. 1-14.*
(Continued)

*Primary Examiner* — Monjur Rahim
(74) *Attorney, Agent, or Firm* — Pillsbury Winthrop Shaw Pittman, LLP

(57) ABSTRACT

Provided is a process that includes: obtaining a first request by a first program associated with a first sub-partition of a first partition of a tamper-evident data store of a decentralized computing platform to read data stored in either (i) a second sub-partition of the first partition of the tamper-evident data store of the decentralized computing platform, or (ii) a second partition of the tamper-evident data store of the decentralized computing platform; determining with a subset of peer computing nodes of a set of peer computing nodes that the first program is authorized to read from the second sub-partition or the second partition; and in response to the determination, causing the requested data to be read from the second sub-partition or the second partition.

38 Claims, 7 Drawing Sheets

(51) Int. Cl.
*G06F 16/901* (2019.01)
*G06F 3/06* (2006.01)
*H04L 9/06* (2006.01)

(52) U.S. Cl.
CPC ........ *G06F 3/0679* (2013.01); *G06F 16/9024* (2019.01); *H04L 9/0643* (2013.01)

(58) Field of Classification Search
USPC ........................................................ 713/193
See application file for complete search history.

(56) References Cited

U.S. PATENT DOCUMENTS

| | | | |
|---|---|---|---|
| 10,404,469 | B2 | 9/2019 | Madhavan et al. |
| 10,600,009 | B1* | 3/2020 | Augustine ............ G06F 16/9536 |
| 10,708,046 | B1* | 7/2020 | Ashrafi ................. H04L 9/0858 |
| 11,030,331 | B2* | 6/2021 | Schvey .............. G06Q 20/3823 |
| 2015/0127940 | A1 | 5/2015 | Polehn |
| 2016/0191243 | A1 | 6/2016 | Manning |
| 2016/0344550 | A1 | 11/2016 | Anton |
| 2017/0033932 | A1* | 2/2017 | Truu .................... H04L 63/102 |
| 2017/0034217 | A1* | 2/2017 | Anton ................. G06F 16/2219 |
| 2017/0046526 | A1 | 2/2017 | Chan |
| 2017/0295023 | A1 | 10/2017 | Madhavan |
| 2017/0338967 | A1 | 11/2017 | Lewison |
| 2017/0364698 | A1* | 12/2017 | Goldfarb ............. G06F 16/9024 |
| 2017/0364700 | A1* | 12/2017 | Goldfarb ............... H04L 9/3247 |
| 2018/0205552 | A1* | 7/2018 | Struttmann ........... G06F 21/602 |
| 2018/0341930 | A1 | 11/2018 | Moir |
| 2019/0043025 | A1 | 2/2019 | Martirosyan |
| 2019/0172026 | A1 | 6/2019 | Vessenes et al. |
| 2019/0190896 | A1 | 6/2019 | Singh |
| 2019/0220813 | A1 | 7/2019 | Madisetti |
| 2019/0238327 | A1* | 8/2019 | Li .......................... H04L 9/0861 |
| 2019/0305935 | A1 | 10/2019 | Qiu |
| 2019/0305957 | A1* | 10/2019 | Reddy ................... H04L 63/123 |
| 2019/0334730 | A1 | 10/2019 | Endress et al. |
| 2020/0137154 | A1 | 4/2020 | Wu |
| 2020/0213088 | A1 | 7/2020 | Qiu |
| 2020/0295935 | A1* | 9/2020 | Kayan ................ G06Q 30/0185 |
| 2020/0322162 | A1 | 10/2020 | Beberman |
| 2021/0157875 | A1* | 5/2021 | Lu .......................... G06F 16/958 |

OTHER PUBLICATIONS

"A Next-Generation Smart Contract and Decentralized Application Platform," Ethereum Whitepaper, https://ethereum.org/en/whitepaper/ Jan. 1, 2013.
International Search Report and Written Opinion in related international application PCT/US2020/062899 dated Mar. 15, 2021.
Tien Tuan Dinh et al., "A Blueprint for Interoperable Blockchains," arxiv.org, Cornell University Library, 201 Olin Library Cornell University Ithaca, NY 14853, (Oct. 2, 2019) XP081502047.
International Search Report in related International Application No. PCT/US2018/035672 dated Aug. 8, 2018.
Written Opinion of the International Searching Authority in related international application No. PCT/US2018/035672 dated Aug. 8, 2018.
International Preliminary Report on Patentability from related international application No. PCT/US2018/035672 dated Dec. 3, 2019.
Ethereum: "White Paper? ethereum/wiki," Apr. 13, 2016.
Github: "Quorum Whitepaper," Nov. 22, 2016.

* cited by examiner

CROSS-PARTITION CALLS IN PARTITIONED, TAMPER-EVIDENT DATA STORES

CROSS-REFERENCE TO RELATED APPLICATIONS

This patent application claims the benefit of U.S. provisional application 62/942,622 filed 2 Dec. 2019, titled "CROSS-PARTITION CALLS IN PARTITIONED, TAMPER-EVIDENT DATA STORES." The entire content of each afore-mentioned patent filing is hereby incorporated by reference.

BACKGROUND

1. Field

The present disclosure relates generally to tamper-evident data stores and, more specifically, to cross-partition calls in partitioned, tamper-evident data stores.

2. Description of the Related Art

Tamper-evident data stores are often used to record data in a way that is generally computationally infeasible to subsequently modify without leaving evidence of the modification in the data structure. Often, these data stores associate the recorded data entries with the output of a one-way function based upon those entries. Inconsistency between the output of the one-way function and the entry at some point in the future indicates tampering. Tampering can often be checked by re-calculating the one-way function based on the current version of the entry to determine if the output matches that present in the data store. If it does not match, tampering is potentially indicated.

One-way functions generally exhibit relatively high computational complexity (e.g. in time complexity or memory complexity) to compute the input given the output (e.g., to reverse the function), but relatively low computational complexity to compute an output from a given input. Generally, such functions are computationally expensive to reverse, typically to the point of not being commercially feasible. For instance, many one-way functions require more than 10-year's computing time with a consumer-grade, state-of-the-art central processing unit to determine an input that results in a predefined output. To further harden the data structure, inputs and outputs of these one-way functions may be chained and combined with various varying values, like timestamps, to amplify the computational complexity required to reverse the computation.

As a result, changes to entries in the tamper-evident data structure result in entries that are internally inconsistent with the outputs of various one-way functions based on those entries. Tampering can generally be detected by an auditor process that re-computes the result of one-way functions based upon the current entry and determines whether the result is consistent with those already present in the data store. Changes to entries render the tamper-evident data store internally inconsistent in a way that is computationally infeasible to avoid, e.g., by tailoring the modified entry to produce the same output of a one-way function.

SUMMARY

The following is a non-exhaustive listing of some aspects of the present techniques. These and other aspects are described in the following disclosure.

Some aspects include a process, including: obtaining, with a computer system, a first request by a first program associated with a first sub-partition of a first partition of a tamper-evident data store of a decentralized computing platform to read data stored in either (i) a second sub-partition of the first partition of the tamper-evident data store of the decentralized computing platform, or (ii) a second partition of the tamper-evident data store of the decentralized computing platform, wherein: the tamper-evident data store comprises a plurality of partitions, including the first partition and the second partition, each of the plurality of partitions corresponding to a different directed acyclic graph of cryptographic hash pointers, the decentralized computing platform is configured to associate programs executed on the decentralized computing platform with partitions and sub-partitions of partitions, the decentralized computing platform is configured to prevent programs from reading data in sub-partitions or partitions with which the programs are not associated, and programs executable on the decentralized computing platform are authorized to write program state to the sub-partitions and partitions with which respective programs are associated; determining, with the computer system, with a subset of peer computing nodes of a set of peer computing nodes upon which the decentralized computing platform executes, that the first program is authorized to read from the second sub-partition or the second partition; and in response to the determination, causing the requested data to be read from the second sub-partition or the second partition and provided to the first program.

Some aspects include a virtual machine having an opcode configured to effectuate cross-partition or cross-sub-partition calls by changing a pointer to a state trie responsive to arguments of the opcode.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
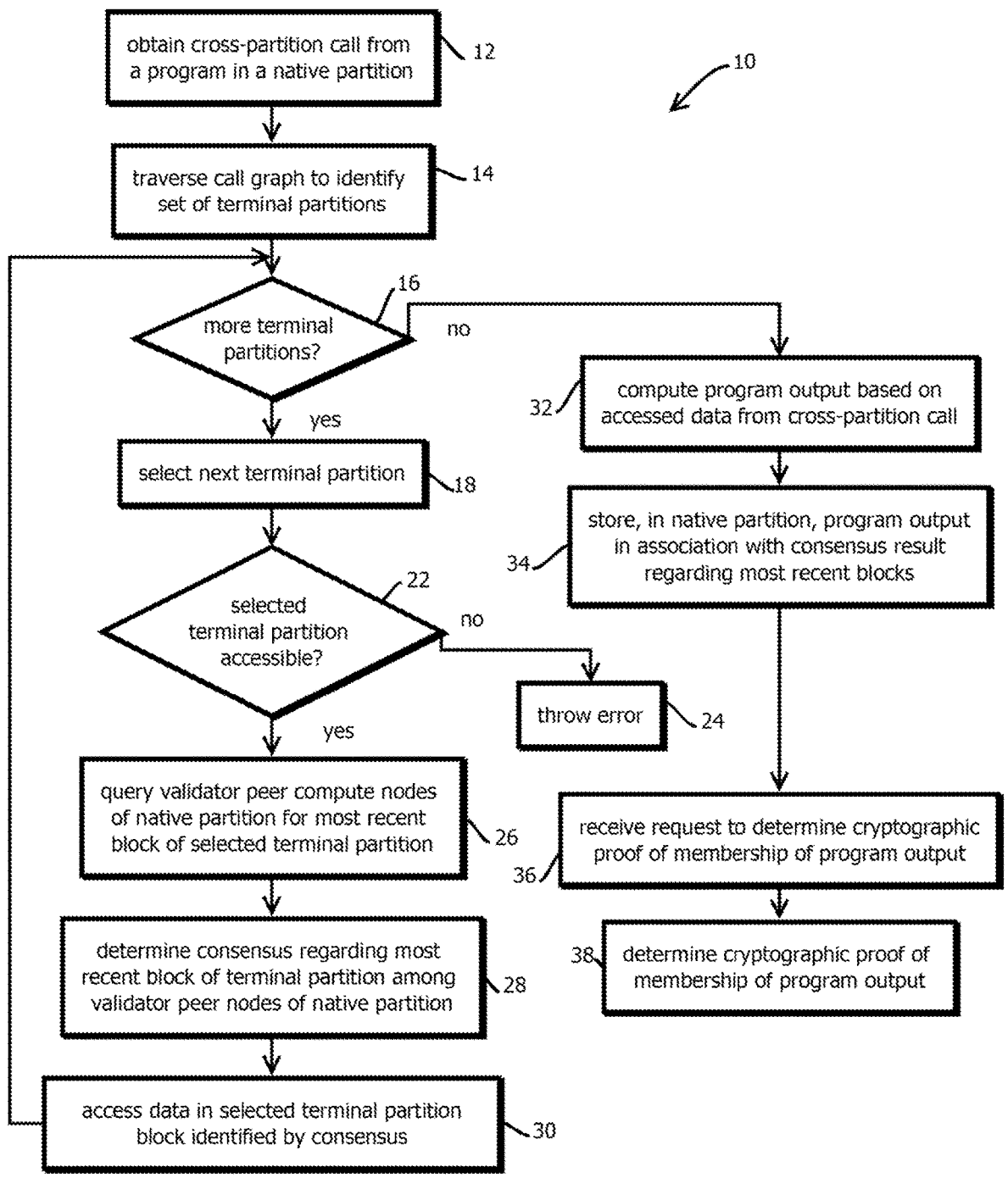
FIG. 1 is a flowchart depicting an example of a process by which cross-partition calls may be made in tamper-evident data stores, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of cryptography and decentralized computing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some cases, tamper-evident data structures are partitioned. With some forms of partitions, programs associated with one partition may be prevented from accessing (e.g., reading or writing) data in another partition. Partitioning is done for a variety of reasons. Examples include facilitating data security within an organization (or other entity), for instance, where access is restricted based on roles and permissions. Examples also include facilitating shared use of tamper-evident data stores by members of multiple organizations, where one organization does not want those in other organizations to access their data in the shared data store. Such multi-tenant use cases are particularly relevant to many blockchain-based architectures, where organizations coordinate and cooperate via programs that persist state to tamper-evident data structures. Examples include smart contracts that execute on a decentralized computing platform and that render program state tamper-evident with one or more blockchains. Different users may wish to constrain which data stored by a decentralized computing platform can be accessed by other users of a smart contract, the blockchain, or other blockchains operated upon by the decentralized computing platform.

In some cases, some types of partitions are coded into infrastructure by which the decentralized computing platform and tamper-evident data store are implemented. For example, smart contracts and other programs may be executed by virtual machines run on peer computing nodes, and those virtual machines may be configured to constrain a program's access to data in one partition of a tamper-evident data store, like in a single blockchain, a subset of blockchains, or a virtual address space corresponding to the partition. Often, the instruction set of the virtual machine does not support changing the identifier of the partition responsive to operation of an instruction in a program executed by the virtual machine.

Partitions can present challenges in certain use cases. It may be desirable for a program to have read access to certain tamper-evident data outside a partition of that program, and in some cases, it may be desirable constrain some other programs executed by the same decentralized computing platform from accessing that same data. In some scenarios, it may be useful for the inputs to a program, like a smart contract, to be both selectively accessible to different programs and verifiably immutably stored by a tamper-evident data store. Examples include smart contracts that take as inputs published data, like weather reports, market data, sporting-event results, and the like. Further, in some cases, the parties publishing that data may wish to restrict access to those entities have a subscription to the published data, or to programs deployed by such entities. Often partitions preclude such use cases and afford relatively coarse-grained control over access to partitions, for instance, with a single level of partitioning, and without supporting sub-partitions of partitions. Finally, many partitions are implemented in blockchain-based computing platforms (or other decentralized computing platforms) with an instruction set that constrains the set of valid operations that can be performed to prevent cross-partition access to data. Often such platforms execute smart contracts and other programs within virtual machines that lack opcodes to access data outside of a native partition of the program, as the systems were designed to prevent access to external partitions. None of the preceding should be taken to suggest that any technique is disclaimed or that the approaches described herein may not be used in conjunction with other approaches having these or other described features.

To mitigate these issues, some embodiments execute a process described below with reference to FIG. 1 that controls cross-partition access to data in a tamper-evident data store. Storage may take a variety of forms, including entries stored in leaf-nodes of directed acyclic graphs of cryptographic hash pointers (e.g., on-chain entries), and entries rendered tamper-evident by a cryptographic hash digest stored in such a graph (e.g., off-chain entries). Some embodiments execute a process described below with reference to FIG. 2 that controls cross-sub-partition access to data in a tamper-evident data store, e.g., across sub-partitions of the same partition, where the sub-partitions impose various forms of access control within the partition. In some embodiments, data is rendered tamper-evident with data structures like those described with reference to FIGS. 3A and 3B. In some embodiments, these processes may be executed on logical and physical architectures like those described below with reference to FIG. 4, maintaining data privacy and access controls like those described with reference to FIG. 5, and executing on computing devices like those described with reference to FIG. 6.

In some embodiments, the process 10 of FIG. 1, like the other processes and functionality described herein, may be implemented as computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the operations may be executed in a different order from that described, some operations may be executed multiple times per instance of the process's execution, some operations may be omitted, additional operations may be added, some operations may be executed concurrently and other operations may be executed serially, none of which is to suggest that any other feature described herein is not also amenable to variation.

In some embodiments, the process 10 may execute on a decentralized computing platform operative to persist state to a decentralized tamper-evident data store, like one or more blockchain-based computing platforms or other decentralized applications, like Swarm, Dat, Interplanetary File System, and the like. Examples of such computing platforms include AxCore, Ethereum, Hyperledger (e.g., Sawtooth, Fabric, or Iroha, or the like), Corda, Openchain, Stellar, NEO, Libra, Bitcoin, and EOS. In some embodiments, the decentralized computing platform is a Turing-complete decentralized computing platform operative to execute smart contracts (or other programs) on the computing platform in a decentralized manner with verifiable computing techniques. For instance, computations may be replicated on each of a plurality of (like a randomly or pseudo-randomly selected subset of, or all of) peer nodes of the computing platform, and a consensus may be reached regarding results of the computation, such that a malicious actor is impeded from interfering with results of the computation by peer nodes outside their control.

In some embodiments, the underlying computing hardware may be un-trusted, and various consensus algorithms may be applied to ascertain results of computation and state of the various processes executed thereon in a manner that does not require any one computing device to be trusted.

Some embodiments may execute various consensus algorithms (e.g., Paxos, Raft, Hotstuff, Honey Badger Byzantine Fault Tolerance, Practical Byzantine Fault Tolerance, or Helix). In some cases, a subset of peer nodes may participate in the consensus determination. In some cases, peer nodes may determine respective roles including leader, candidate, and follower, and the devices may determine sequence of changes in roles with a monotonically increasing number, like a term number. At each term number increment, the peer nodes may elect a new leader. Peer nodes, in an election, may send requests to other peer nodes for votes. A majority vote holder may be designated as a leader for the current term increment. Messages between peer nodes may include a term number of the sending peer node, and requests with stale term numbers (relative to a receiving peer node) may be rejected. In some embodiments, the leader node may periodically broadcast heartbeat messages to follower nodes, and follower nodes may trigger elections responsive to determining that a heartbeat message has not been received in a threshold amount of time since a last heartbeat message.

In some embodiments, authority of peer nodes to participate in consensus may be determined in virtue of peer nodes demonstrating some form of proof to other peer nodes. In some embodiments, the proof is proof of work, for instance, by computing a hash collision to some threshold number of digits with a cryptographic hash function, or the proof may be proof of stake or proof of storage, for example. In some embodiments, the proof is of possession of a secret value, like a private key of a cryptographic key pair used to sign a value (e.g., a pseudorandom challenge) associated with the nodes public key.

In some embodiments, the process is implemented with one or more smart contracts or other programs. In some embodiments, this may include obtaining a source code version of the smart contract, for example, encoded in a language like Solidity, Java, Scala, Go, or the like, for instance, from a developer. In some embodiments, creating the smart contract may include interpreting the smart contract into bytecode form for a virtual machine of the peer nodes of the decentralized computing platform. Interpreting may include parsing the bytecode, forming an abstract syntax tree representation, and transforming the abstract syntax tree into a bytecode representation by mapping entries in the tree to opcodes (corresponding to bytecodes) (and parameters of such opcodes) of a target runtime environment. In some embodiments, that bytecode may encode various opcodes of the virtual machine, and in some embodiments, some of those opcodes may be cross-partition or cross-sub-partition opcodes like those described in greater detail below with reference to FIGS. 1 and 2. The term smart contract is used broadly to refer to both the source code encoding and bytecode encodings or other transformations thereof (e.g., compiled to machine code). For instance, reference to "a smart contract" and "the smart contract" may refer to a source code form of the smart contract and a bytecode form of the smart contact respectively or source code or bytecode instances in both references. The encoding may evolve formats while still bearing the same label.

Smart contracts may be scripts or other types of programs, and smart contracts may include references to local and global state, the latter being shared potentially among multiple smart contracts or other types of programs, and the former being isolated from other smart contracts. In some embodiments, a given smart contract may have subroutines, like methods or functions thereof. In some embodiments, the smart contracts may take arguments, and different methods or functions may take different arguments. In some embodiments, upon execution, the smart contract may persist state to the tamper-evident data store of the decentralized computing platform upon which it executes, as described in greater detail below.

In some embodiments, creating the smart contract may include deploying the smart contract. In some embodiments, the smart contract may be deployed to an address of the decentralized computing platform that uniquely identifies the smart contract and distinguishes it from other smart contracts and other entities, like wallet addresses on the decentralized computing platform or external accounts on other decentralized computing platforms. The address may be an application-layer address in the Open Systems Interconnection model (OSI model). In some embodiments, the address is based on (e.g., a cryptographic hash based on) a public key for an external account, an address of the account that deploys the smart contract, and a nonce (e.g., a counter that is incremented with each deployment).

In some embodiments, the address of the smart contract is explicitly defined by the smart contract itself in a form other than as a hash of an encoding of the smart contract. In some embodiments, the smart contract may be called on the decentralized computing platform by addressing a message (or other transaction) to this address and appending various arguments and identifiers of subroutines being invoked to the extent a subroutine rather than a main function is invoked.

Some embodiments may log a transaction in which the smart contract is created or otherwise deployed to the tamper-evident data store, e.g., by recording some or all of the information of the transaction. In some embodiments, the log of the transaction may include a cryptographic hash of the code of the smart contract, thereby rendering changes to that code tamper evident, and some embodiments may execute a cryptographic proof of membership (e.g., Merkle proof) of the code to verify the absence of tampering each time the smart contract is invoked. In some embodiments, the decentralized tamper evident data store may include various component tamper-evident data structures, like Merkle trees and tries, as described in greater detail with reference to FIGS. 3A and 3B. Trees may store data in leaf nodes, and tries may store data in nodes along paths to leaf nodes, e.g., with a prefix stored in a first node closer to a root node, an intermediate portion of an entry stored in a next node away from the root node, and a suffix stored in a leaf node that defines the path, while a different suffix of another entry sharing the same prefix and intermediate portion may be stored in other paths passing through the first two nodes of the trie.

In some embodiments, different tries may have root nodes documented in (e.g., stored in, or having a cryptographic hash based on their value stored in) the same block of a chain of blocks in a block chain. In some cases, those different tries may include a state trie, a receipt trie, and a transaction trie. In some embodiments, the transaction that deployed the smart contract may be logged to the transaction trie, for instance, in a set of nodes along a path of the trie, and an entry may be created in the state trie, like in a set of nodes along a path of the trie, corresponding to an address of the smart contract upon invocation of the smart contract. In some embodiments, that entry in the state trie may include a storage root of a storage trie that is specific to the smart contract and stores local state of the smart contract, while the state trie may serve as part of global state of the decentralized computing platform, or the state trie may serve as part of global state of one of the domains or subspaces discussed below with reference to FIG. 5, with different domains or subspaces having different state tries.

Some embodiments may implement a cryptographic proof of membership with a cryptographic accumulator or other one-way membership function. Examples include bilinear accumulators, imaginary quadratic class group accumulators, quasi-commutative hash functions, RSA accumulators, and the like. Such cryptographic accumulators may be used in place of the block-specific tries discussed below (which are also examples of cryptographic accumulators), for example.

In some embodiments, the decentralized computing platform responds when the smart contract is invoked by executing the smart contract and persisting an updated state to a tamper-evident data store. In some embodiments, the decentralized computing platform may host a plurality of smart contracts, like more than 5, more than 10, more than 100, or more than 10,000 smart contracts concurrently being hosted. Those smart contracts may be created by more than 2, more than 5, more than 10, more than 100, or more than 1000 different creators of smart contracts. In some embodiments, a smart contract may create or invoke a set of smart contracts, and those smart contracts may create or invoke another set of smart contracts, and so on, in a creation graph or call graph.

Figure 5:
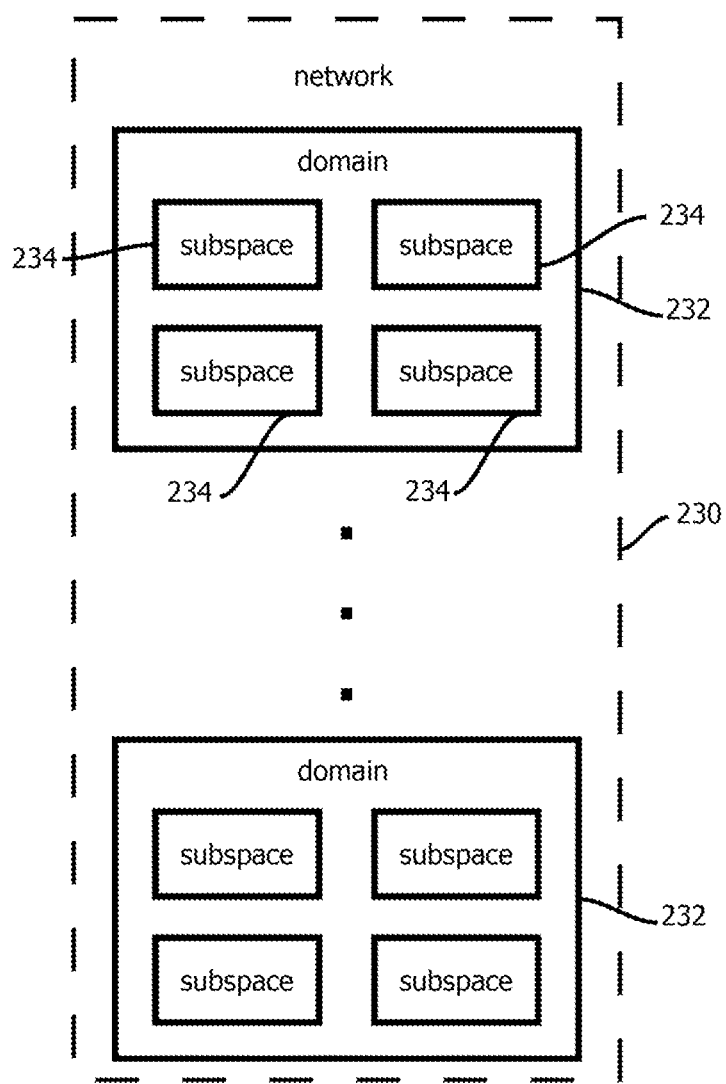
FIG. 5 is a block diagram depicting access controls that may be implemented by the decentralized computing platform of FIG. 4, in accordance with some embodiments of the present techniques.

An example of partitions and sub-partitions are shown in FIG. 5, in which partitions are exemplified by domains and sub-partitions are exemplified by subspaces. In some embodiments, state of all of these different programs may be persisted to (e.g., stored in a manner that survives between instances of invocation) the same tamper-evident data store, in some cases in different designated subsets thereof for different subgroups of smart contracts, like according to the domain and subspace architecture described below with reference to FIG. 5. In some embodiments, a given smart contract may be invoked a plurality of different times, like more than 5 or more than 10 by a plurality of different entities each having different addresses on the decentralized computing platform from which they send transactions invoking the smart contract to the address of the smart contract. Different entities and different invocations at different times may invoke different functionality in the smart contract, for instance, different subroutines to evolve state of the smart contract over time. In some cases, each of those transactions may be logged to the transaction trie of a current block of a block chain. The logged transactions may be used to synchronize new peer computing nodes. A late arriving node to the decentralized computing platform may re-create current state of the tamper-evident data store by replaying transactions (e.g., other than those subject to pruning) since the beginning epoch of the tamper-evident data store to arrive at a current version of the tamper-evident data store in local memory that is synchronized with versions stored on other peer nodes. In some embodiments, a late arriving node to the decentralized computing platform may re-create current state of the tamper-evident data store by reconciling state against the root hash of the block without replaying transactions.

In some embodiments, generally requesting execution of instructions of smart contracts may be performed with transactions or other messages conveyed on the decentralized computing platform. The terms transmitting and conveying and the like, in the context of decentralized computing platforms, do not necessarily require that the transmitter and the receiver be in different physical locations. Rather, one account physically represented in data stored on every node (or a subset with a designated role the includes such storage) of a computing platform may transmit a transaction to another account that is also physically represented in data also stored in every node on that computing platform. Thus, transmission may happen at the account layer without necessarily requiring that the sender and receiver be in different physical locations. In some embodiments, the transaction by which the smart contract's functionality is invoked may be logged to the tamper-evident data store, for example, in a set of nodes along a path of a transaction trie associated with a current block being composed, or in a leaf node of a Merkle tree. In some embodiments, the transaction may include a remote procedure call with arguments and an identifier of a subroutine of the smart contract being invoked, along with a unique identifier, like an address of the smart contract that distinguishes the smart contract from other smart contracts deployed to the platform, and an address of the invoking entity in the decentralized computing platform.

In some embodiments, in response, the decentralized computing platform may execute the invoked functionality of the smart contract. In some embodiments, this may include determining whether the invoking party has authority to modify program state of the smart contract in a subspace (or other sub-partition) of a domain (or other partition) described below with reference to FIG. 5 before determining to execute the invoked functionality. In some embodiments, executing the invoked functionality may cause the program state of the smart contract to evolve from a first program state at a first time in the past to a second program state produced by executing the invoked functionality. Examples include changing a balance of a number of ERC-20 (e.g., fungible, rivalrous) cryptographic tokens (or other digital bearer assets) in an account, determining whether signatures in an escrow transaction have been received, creating or otherwise modifying non-fungible cryptographic assets (like an ERC 721, e.g., non-fungible, rivalrous cryptographic token), or the like. Program state may include values of variables, the state of which affect branching in program flow of the smart contract or other smart contracts. Program state may include values for a variety of different types of variables, ranging from integers, Boolean values, the string values, or the like, and program state may include more feature-rich data structures, like binary large objects (blobs), dictionaries, lists, arrays, and the like. The values attributed to these items may serve as program state, and program state may evolve over time as those values change in virtue of execution of the smart contract. Some program state may be local to a subroutine, some program state may be local to a smart contract but accessible to each subroutine (e.g., global within the context of the smart contract but local within the context of the decentralized computing platform). Some program states may be global with respect to a subspace (or other sub-partition), domain (or other partition), or the decentralized computing platform, with the former two examples being local with respect to other subspaces (or other sub-partitions) or other domains (or other partitions).

In some embodiments, program state may include ephemeral program state and persistent program state, the latter surviving between instances in which the smart contract is invoked, while the former may be discarded between invocations in some cases, for instance, with a garbage collection routine of a virtual machine upon which the smart contract executes. In some embodiments, ephemeral program state may be stored in a storage trie. A root cryptographic hash of the storage trie may be stored (e.g., as key-value pairs that map variable names to the values they bear) in a storage root field of an entry in a state trie corresponding to the invocation instance of the smart contract, as described in greater detail below with reference to FIGS. 3A and 3B.

Some embodiments may append an update to program state to the tamper-evident data store during or after execution of the smart contract. In some embodiments, this may include updating records corresponding to accounts of different entities having addresses on the decentralized computing platform. In some embodiments, the update may include updating a state trie to indicate an instance in which the smart contract was invoked and to add a pointer to a previous instance in which the smart contract was invoked, as described in greater detail below with reference to FIGS. 3A and 3B. In some embodiments, the update may further include the update to the state trie described above including the storage root value for the storage trie, and in some cases this may include corresponding updates to a receipts trie and a transaction trie as described below in reference to FIGS. 3A and 3B. In some embodiments, these updates may be rendered tamper evident with a graph of one-way function computations based upon the updates, for example, in an acyclic directed graph of cryptographic hash pointers or nested ciphertexts where one ciphertext contains a plurality of ciphertexts, which each contain still more ciphertexts of values rendered tamper evident.

Acyclic directed graphs of cryptographic hash pointers may take a variety of forms, including linked lists, skip lists, tries, and combinations thereof. In some embodiments, the graph is in an associative data structure. In some embodiments, the graph includes a plurality of nodes having content. In some embodiments, a subset of the nodes of the graph or all nodes may have content being rendered tamper evident, and a subset of nodes may have content based upon cryptographic hashes of other nodes linked to that respective node by a directed edge, like a pointer to a node having content upon which the cryptographic hash is based. Examples include a cryptographic hash of the content of an adjacent node in the graph and a timestamp. In some embodiments, the graph may be structured to afford a relatively fast access to individual entries, for example with a skip list having nodes with content that each correspond to a respective trie, like a radix trie or Merkle tree.

A variety of different types of cryptographic hash functions may be used. Examples include SHA-2, SHA-3, BLAKE2, or the like. In some cases, the cryptographic hash function deterministically maps an input of arbitrary length to a fixed-length output with a one-way function. In some embodiments, the hash function is based on a Merkle-Damgård construction, or some embodiments may avoid this architecture to mitigate risk of length extension attacks. In some cases, the fixed-length output is greater than or equal to 4-bytes, 8-bytes, 16-bytes, 32-bytes, 64-bytes, 128-bytes, 256-bytes, 512-bytes, or 1028-bytes.

Before, during, or after invoking the smart contract, some embodiments may include executing a cryptographic proof of membership to verify the absence of tampering. In some embodiments, this may include verifying the absence of tampering of a designated entry in the tamper-evident data store, for example, at a designated set of nodes along a path of a radix trie. Some embodiments may recompute the cryptographic hash values of a sequence of nodes of cryptographic hash pointers along a path terminating in the designated entry and confirm that the cryptographic hash values correspond to those produced by the designated entry. Upon detecting that the cryptographic hash values produced by the current entry do not correspond to those present in the directed acyclic graph, some embodiments may determine that tampering has occurred and emit an alarm or block a transaction. Alternatively, upon determining that the cryptographic hash values match those currently present in the directed acyclic graph, some embodiments may determine that tampering has not occurred and permit a transaction to complete or emit a confirmation event.

In some embodiments, a subset or all of the smart contracts deployed to the decentralized computing platform may include a pruning subroutine, like that described in U.S. Prov. Pat. App. 62/907,271, filed 27 Sep. 2019, titled Pruning Entries in Tamper-Evident Data Stores, the content of which is hereby incorporated by reference.

FIG. 1 illustrates an example of a process 10 by which a program, like a smart contract, native to (e.g., having an address space for program state in) one partition (like a sub-partition thereof, or a non-sub-partitioned partition) may access data (e.g., other programs or records) of another partition (like a sub-partition thereof, or a non-sub-partitioned partition). In some embodiments, the process 10 is executed upon an account invoking the program making the cross-partition call with a transaction having arguments of the program and its address. In some embodiments, programs may include calls to other programs or calls (like access requests) to records at addresses in other partitions. In some embodiments, the program doing the calling may have a native partition, which may be a default partition of a tamper-evident data store to which the program has access and records its state. In some embodiments, the program may further have a native sub-partition, like those described below, for instance, whereby access to a given partition is segmented to isolate and control access to data in different sub-partitions. In some cases, sub-partitions may be subject to further partitioning in an arbitrarily deep nesting, for instance, including 3, 4, 5 or more levels.

In some embodiments, the program making the call may be a program executed by one of the decentralized computing platforms described herein. In some embodiments, the program may have one and only one native partition. In some embodiments, the program may have multiple native partitions. In some cases, the program may also have access to a shared partition to which programs in other partitions have access, like all other partitions. In some embodiments, the native partition is a blockchain or other directed acyclic graph of cryptographic hash pointers in which program code of the program is stored and state of the program is updated upon invocation of the program. In some cases, each partition corresponds to a different blockchain or other directed acyclic graph of cryptographic hash pointers.

In some embodiments, the program is invoked by sending a transaction to an address of the program in the native partition. In some embodiments, programs that are not in the native partition, e.g., by default, may not have access to data stored in the native partition, including access to invoking the program subject to the process of FIG. 1. In some embodiments, the program may not, e.g., by default, have access to data (e.g., programs or records) stored in partitions (e.g., non-shared partitions) other than the native partition of the program. For example, by default, the program referenced in the process 10 may execute in a first partition and, by default, may not have access to data stored in a second partition of the same decentralized computing platform.

In some embodiments, the process 10 may include obtaining a cross-partition call from the program in the native partition, as indicated by block 12. In some embodiments, the call may be a remote procedure call, an application program interface (API) request, a read-request for data at an address, a function call, an invocation of another program, or various other programmatic calls by which data may be accessed, for instance, read, caused to execute, or written. In some embodiments, the cross-partition call is implemented with a line of code in the program that invokes another program or otherwise request access to data in another partition, different from the program's native partition.

In some embodiments, the cross-partition call, when in source-code form, compiles to, or is interpreted to, an opcode executable by a virtual machine in which the program executes. In some cases, the opcode takes various arguments from the cross-partition call. In some embodiments, the arguments include an identifier of another partition, different from the native partition, that uniquely identifies the called partition among a plurality of partitions of a tamper-evident data store that also includes the native partition. In some embodiments, the arguments further include an identifier of a sub-partition (or sub-sub-sub-partition, for instance) within the called partition, which in some cases may be accessed with techniques like those described below with reference to FIG. 2, in some cases in combination with the operations of FIG. 1. In some embodiments, the arguments also include an address or identifier that resolves to an address of data for which access is requested in the called partition, which may include an address of a program, like a smart contract in the called partition and various arguments of the called program.

In some cases, data resides in one and only one partition at a given level of partitioning. In some cases, partitions operate similar to directories in a hierarchical file system with a single, global hierarchy of partitions and sub-partitions. In some cases, partitions correspond to entries in a database file system, in which units of data are tagged with metadata by which access controls are attached to that data. In such embodiments, a given unit of data (e.g., record or program) may reside in multiple partitions, each corresponding to a different tag having different sets of access controls associated with the unit of data. In some cases, one partition may be virtually mounted as a sub-partition within another to inherit access controls of the partition in which it is mounted.

In some embodiments, the opcode by which cross-partition calls are implemented may be detected by a virtual machine in which the program executes. In some embodiments, the virtual machine may respond to detecting the opcode by parsing the opcode's arguments to identify a called partition. Some embodiments of the virtual machine may then change a current working directory, a virtual address space, a referenced state trie, or other pointer to context of the virtual machine to reference the called partition, and in some cases, a called sub-partition therein, as identified by arguments of the opcode. In some embodiments, the opcode or instruction that invoked the opcode may further cause functionality in the called partition to be invoked, for instance, by calling a program native to the called partition with an API request.

In some embodiments, the call is an API request, like a query, submitted to a smart contract of a data publisher. For example, a calling smart contract may reference and perform computations based upon a value returned by a publisher smart contract in (e.g., native to) a different partition. Examples include smart contracts that operate upon market data, weather data, sports data, or the like, made available from a proprietary data set by a data publisher to subscribers of the proprietary data set. In some cases, the published data is provided by a public source of data, like a governmental entity.

In some embodiments, the returned published data may be cryptographically signed by the publisher. For instance, returned data may be cryptographically signed using a private cryptographic key of the publisher, and the private key may correspond to a public cryptographic key by which the calling smart contract may verify the authenticity of received data from a publisher's smart contract. For instance, data may be verified by confirming, with the calling program, that the cryptographic signature corresponds to the public key of the data provider and that a cryptographically signed hash digest of (and provided with) the provided data corresponds to a hash digest of the received data computed by the calling program.

In some embodiments, the API request includes access credentials of an entity that deployed the calling smart contract or an entity that invoked the deployed smart contract, for instance, passed through as an argument when calling or deploying the calling program. In some embodiments, the data publisher smart contract (or other program) invoked through the API request may receive these credentials and verify the credentials before providing a response to the data request. API requests or other calls may be expressed in a variety of formats, including a structured query language request, XPath request, JSON (JavaScript™ object notation) query requests, or various representational-state-transfer-based API requests.

In some cases, additional techniques may be used to verify that responses are responses to calls by the calling program and not responses to other calls, for instance, by a threat actor. Calls may include a challenge, like a relatively high entropy random value, for instance, more than 64-bits of entropy, that has been encrypted with a public cryptographic key of the data publisher, and responses may include a plain text version, or re-encrypted plain text version of the challenge value. The calling program may confirm that the received challenge value matches that sent to verify a response to a call corresponds to the sent request and not some other request intended to return incorrect data from a legitimate source (e.g., substituting a response with slightly older market data).

Returned data may be put to a variety of uses. Examples include computations of smart contract based upon published market data, like the London interbank exchange rate (LIBOR), the closing price for a security on a given exchange, the closing price for a given commodity on a given exchange, the closing price for a given commodity options contract on a given exchange, or the like. In some cases, a calling program may request the same value from several publishers and compute a measure of central tendency of results, like a mean, mode, or median value, to use in other computations. Examples also include computations based upon sporting results (like the outcome of bets), political contest results (like in betting markets), insurance, and weather-based futures contracts, among others. For example, a smart contract may determine whether to transfer cryptographic tokens from one wallet address to another wallet address responsive to whether data responsive to a call indicates escrow criteria have been met, a party to a smart contract has won a bet, criteria of an option contract have been satisfied, or the like.

In some embodiments, the cross-partition call may be implemented with a program dedicated to making cross-partition calls. In some embodiments, each partition may include a linker program, like a linker smart contract, for instance, in a shared sub-partition. In some embodiments, the linker program may include in its program state an inventory of other partitions or sub-partitions to which the linker program has access. In some embodiments, program state of the linker program may include a mapping of native partitions, native sub-partitions, programs, subprograms, or accounts to other partitions, sub-partitions, programs, or subprograms. The mapping may have links that indicate authorized constraints on access. Examples include read access, write access, prune access, read access with threshold constraints on rates of reading, prune access with threshold constraints on rates of pruning, or write access with threshold constraints on rates of writing. In some cases, the linker program may grant access to every other program in the native partition to a given other partition, or in some cases various subsets of programs in the native partition may have different levels or instances of access to different subsets of other partitions, depending upon mappings of access controls in program state of the linker program. In some embodiments, changes to access controls may be logged to the tamper-evident data store, for instance, in the native partition, in some cases with cryptographic signatures of entities authorized to grant access. In some cases, such signatures may be appended to access requests and verified by the called partition before access is permitted.

Some embodiments may take inventory of a set of terminal partitions in a call graph initiated by the cross-partition call by traversing the call graph to identify a set of terminal partitions, as indicated by block 14. In some cases, a call from the native partition to a second partition may invoke a program in the second partition that then makes a call to a third and a fourth partition, in some cases in call-graphs of arbitrarily large depth and complexity. In this scenario, the identified set of terminal partitions would include the second, third, and fourth partitions, even though the initial call was only to the second partition. In some cases, the call graph may be relatively large, extending into more than 5, more than 20, or more than 50 different partitions, from an initial call to a single partition outside the native partition. In some cases, the traversal is depth first or breadth first, for instance implemented with recursion.

Some embodiments may then process each of the identified terminal partitions as described below. Some embodiments may determine whether there are more terminal partitions to process, as indicated by block 16. Upon determining that there are, some embodiments may select the next terminal position that has not yet been processed, as indicated by block 18. Some embodiments may then determine whether the selected terminal partition is accessible to the calling program identified in block 12, as indicated by block 22. In some cases, this may include interrogating access control mappings in program state of a linker program like that described above. Upon determining that the requested access is not supported, some embodiments may throw an error or other exception, as indicated by block 24, and in some cases, the calling program may include an error handling routine that specifies logic to be executed responsive to an error.

Upon determining that the selected terminal partition is accessible, some embodiments may proceed to execute a set of operations by which the terminal partition is deterministically accessed from the native partition. Deterministically accessing data in another partition may present challenges in decentralized computing platforms, e.g., when accessing partitions for which state is governed by different sets of peer computing nodes than those of the native partition. In some cases, different subsets of peer computing nodes of a decentralized computing platform may, at different times, have different perspectives on state of a tamper-evident data store's partition. Relying on the wrong subset may cause different participants to a smart contract or other program to have inconsistent expectations. For example, a first subset of peer computing nodes may have determined at a given instance in time that a given data node, like a block in a blockchain, has been added to a directed acyclic graph of cryptographic hash pointers, like a blockchain, while a second subset of the peer computing nodes may have not yet determined that the given data node has been added to the directed acyclic graph of cryptographic hash pointers. (The terms data node and computing node are modified by the words data and computing to distinguish the two different types of graphs being referenced, the directed acyclic graph of cryptographic hash pointers, and the network of peer computing nodes upon which decentralized computing platforms execute, respectively.) Counterparties of a smart contract or other program interrogating these different subsets of peer computing nodes may have differing expectations of a result of the net output computation, and the outcome of the calling program may be nondeterministic based upon arbitrary, for instance random, selection among the different subsets.

To make inputs to the calling program deterministic, some embodiments may execute operations like those described with reference to blocks 26 and 28 to determine a consensus position regarding state of the called partition. In some embodiments, the consensus is a consensus among peer computing nodes of the called partition that determine consensus within the called partition regarding state of the called partition. In some embodiments, consensus is determined among a different population of peer computing nodes, for instance, among peer computing nodes of the native partition that determine consensus regarding state of the native partition and have authority to access data in the called partition, for instance, in an observer role like that described below.

Some embodiments may query validator peer computing nodes of the native partition for a most recent block of the selected terminal partition at issue, as indicated by block 26. In some cases, the validator peer computing nodes (of a native partition) may determine consensus regarding state of the native partition. In some cases, the same set (or a subset) of peer computing nodes may have an observer role in the selected terminal partition. In some embodiments, the queried peer computing nodes may not participate in consensus regarding state of the selected terminal partition on behalf of the selected terminal partition in order to commit data to the selected terminal partition. In some embodiments, different queried peer computing nodes of the native partition may have different blocks designated as a most recent block of the terminal partition, for instance, because some of the peer computing nodes have not yet received information about a new block or have not yet validated a new block. As a result, a first subset of the peer computing nodes may designate a first block as a most recent block, while a different subset of the peer computing nodes may designate a second block as a most recent block. In some embodiments, the designations may include a unique identifier of the block among other blocks of the terminal partition, and that identifier may indicate (or be associated with a value that indicates) a sequence of the blocks, for instance, with a timestamp or block number in a count of blocks. In some embodiments, each validator peer computing node may report to all of the other validator peer computing nodes its respective result of the query. In some embodiments, partitions are directed acyclic graphs of cryptographic hash pointers that do not take the form of blockchains, and in such cases, embodiments may still determine a most recent data node added, even though that added data node is not itself necessarily a block.

Some embodiments may determine consensus regarding the most recent block of the terminal partition among validator peer nodes of the native partition, as indicated by block 28. In some embodiments, this may include determining a most recent block, based upon the indication of sequence and the query results, for which all validator peer computing nodes have returned query results indicating that the respective block has been added to the selected terminal partition. In other examples, the consensus result may be that for which more than a threshold amount of validator peer computing nodes have returned query results indicating that the respective block has been added to the selected terminal partition. The threshold may be a majority or a plurality of peer computing nodes serving the validator function in the native partition, for example. A query result may indicate a given block has been added to the terminal position if the given block is identified in the query result or is designated as an earlier block relative to that identified. For instance, if a given validator peer computing node indicates that block number 9 has been added, that validator peer computing node may have also indicated that blocks of 8 through 1 have also been added. In some cases, the block determined to be most recent by validator peer computing nodes of the native partition may different from, e.g., lagging behind, a block designated as most recent by validator peer computing nodes of the terminal partition at issue.

Some embodiments may then access data in the selected terminal partition from the block designated by the consensus determination of block 28 as the most recent, as shown in block 30. In some embodiments, this may include retrieving data from a state trie or calling a smart contract at an address in a state trie of the identify block in the selected terminal partition. Access may include reading or writing values or calling a smart contract to invoke its functionality or calling some other type of program. In some embodiments, accessing data in the most recent block may include accessing data in a prior block with confidence that the data has not been modified in a subsequent block, e.g., upon determining the data is unchanged between the designated most recent block in the prior block. Accessing data may include causing an API to be called, calling the API, causing a result to be received, or receiving the result. One may "access data" by requesting and receiving a response, without performing the intervening action of reading and writing bits in the authoritative repository, for example, though "accessing data" is also consistent with affirmatively performing the action of reading and writing bits in the authoritative repository. Some embodiments may access, from a first partition, a second partition of the tamper-evident data store of the decentralized computing platform by accessing a sub-partition in the second partition, accessing a second partition that is not sub-partitioned, or accessing a portion of the second partition that is not sub-partitioned.

Some embodiments may then return to block 16 and determine whether there are more terminal partitions. In some embodiments, the operations of blocks 14 and 16 may be merged, as the call graph is traversed concurrently with accessing data by invoking programs that call other programs, which is not to suggest that any other operation described herein may not also be merged with other operations otherwise varied. Upon determining that there are more terminal partitions to the process, the above described operations may be repeated.

Upon determining that there are no more terminal partitions to process, some embodiments may proceed to block 32 and compute the output of the calling program based on accessed data from the cross-partition call, as indicated by block 32. The output may take a variety of forms, including transferring cryptographic tokens between accounts, updating a ledger to indicate transactions in which the transfers occurred, and the like.

Some embodiments may store in the native partition, program output from block 32 in association with the consensus result regarding the most recent block or blocks, as indicated by block 34. In some embodiments, this data may be stored in a state trie like that described below.

Some embodiments may subsequently receive a request to determine cryptographic proof of membership of program output, as indicated by block 36. In some cases, this may be a result of an audit to determine the absence of tampering in a native partition.

Some embodiments may determine cryptographic proof of membership of program output in response, as indicated by block 38. In some embodiments, this may include re-computing the program output and verifying that the cryptographic hash function outputs match those stored in cryptographic hash pointers in a directed acyclic graph of cryptographic hash pointers corresponding to the native application. Some embodiments may further verify cryptographic hash pointers in the identified most recent blocks to confirm that recomputed outputs of the program are based upon inputs from calls that were not subject to tampering, for instance, by retrieving values in the identified most recent blocks, which may no longer be most recent blocks, as the terminal partitions may have added additional blocks, or otherwise appended additional data nodes to their respected directed acyclic graphs of cryptographic hash pointers.

Figure 2:
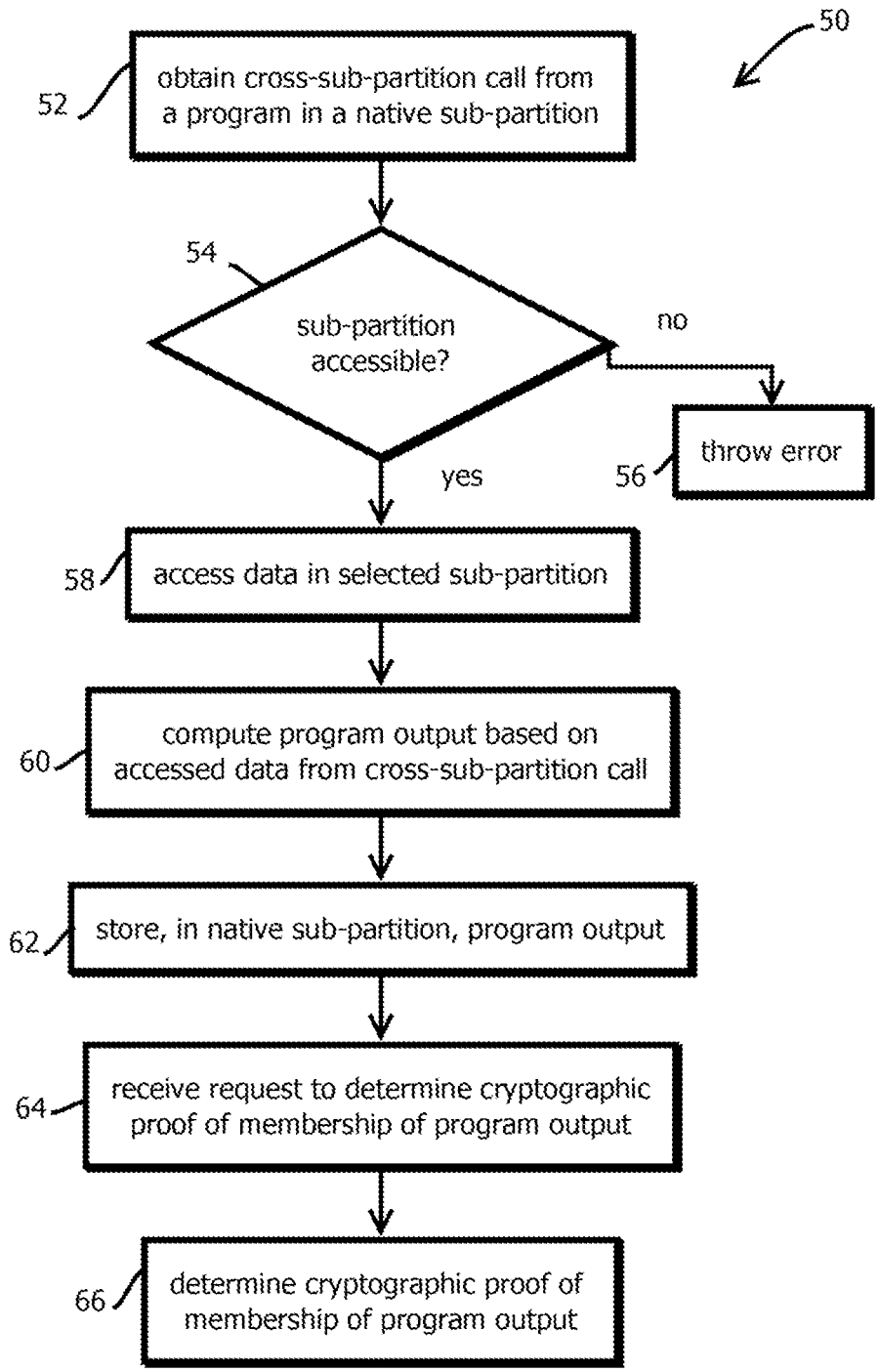
FIG. 2 is a flowchart depicting an example of a process by which cross-sub-partition calls may be made in tamper-evident data stores, in accordance with some embodiments of the present techniques.

FIG. 2 illustrates an example of a process 50 by which cross sub-partition calls may be implemented. In some embodiments, calls may be across both sub-partitions and partitions, or calls may be across sub-partitions within the same partition. In some embodiments, the calls may be instigated under circumstances like those described above, for instance, with various types of smart contracts that reference data accessible via an API in another sub-partition or data stored in records in another sub-partition. In some embodiments, the process 50 includes obtaining a cross-sub-partition call from a program in a native sub-partition, as indicated by block 52. The program may be in a native sub-partition of a native partition, and that native partition may have several sub-partitions. In some embodiments, some of the sub-partitions may be shared partitions accessible to all sub-partitions, while other sub-partitions may be inaccessible to programs in other sub-partitions.

In some embodiments, the process 50 includes determining whether the sub-partition is accessible to the program, as indicated by block 54. Some embodiments may include a linker program in a shared sub-partition like that described above, which may use operations like those described above to determine whether a mapping of the linker program indicates that the program is authorized to access data in the called sub-partition. Upon determining that the access is not permitted, some embodiments may proceed to block 56 and thrown an error, which in some cases may be handled by an error handling subroutine of the calling program.

Alternatively, upon determining that the sub-partition is accessible, some embodiments may proceed to access data in the selected sub-partition, as indicated by block 58. Again, access may take the various forms described above.

Some embodiments may compute a program output based on the accessed data from the cross-sub-partition call, as indicated by block 60. Some embodiments may then store in a native sub-partition the program output, as indicated by block 62. Subsequently, some embodiments may receive a request to determine cryptographic proof of membership of a program output, as indicated by block 64. Some embodiments may respond by determining the cryptographic proof of membership of the program output, as indicated by block 66, each consistent with the approaches described above.

In some embodiments, the sub-partitions may be within the same native partition, and as a result, the peer computing nodes may have a native consensus regarding a most recent block added to the native partition, making the access request deterministic. In cases in which the call is across sub-partitions and across partitions, operations like those described above with reference to blocks 26 through 30 in FIG. 1 may be implemented to make access requests deterministic. Similarly, the described operations may further involve a chained and branching set of cross sub-partition calls, and some embodiments may traverse the call graph with operations like those described above with reference to blocks 16 through 22.

Figure 3A:
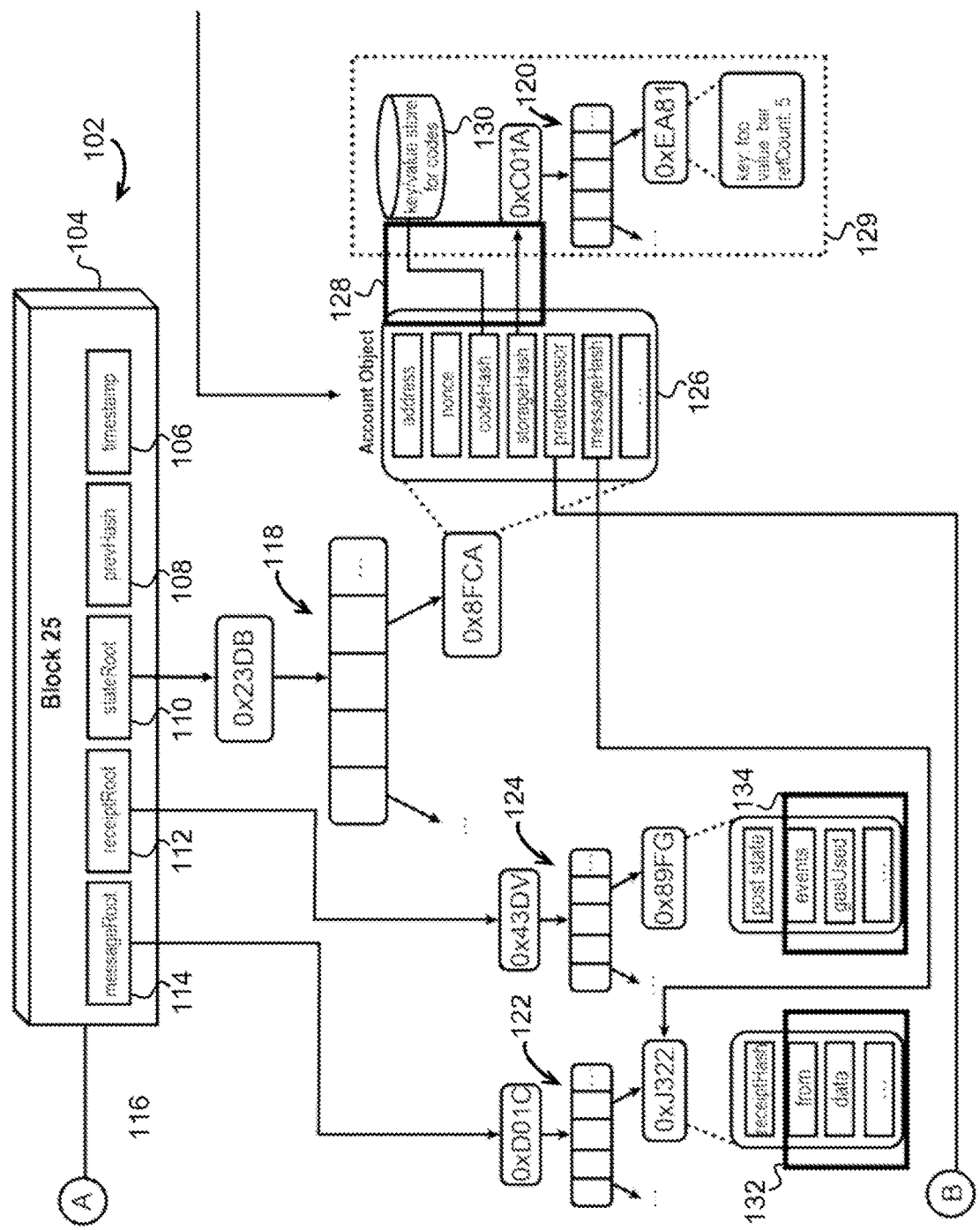
FIGS. 3A and 3B are schematic diagrams of an example of a tamper-evident data store, in accordance with some embodiments of the present techniques.
Figure 3B:
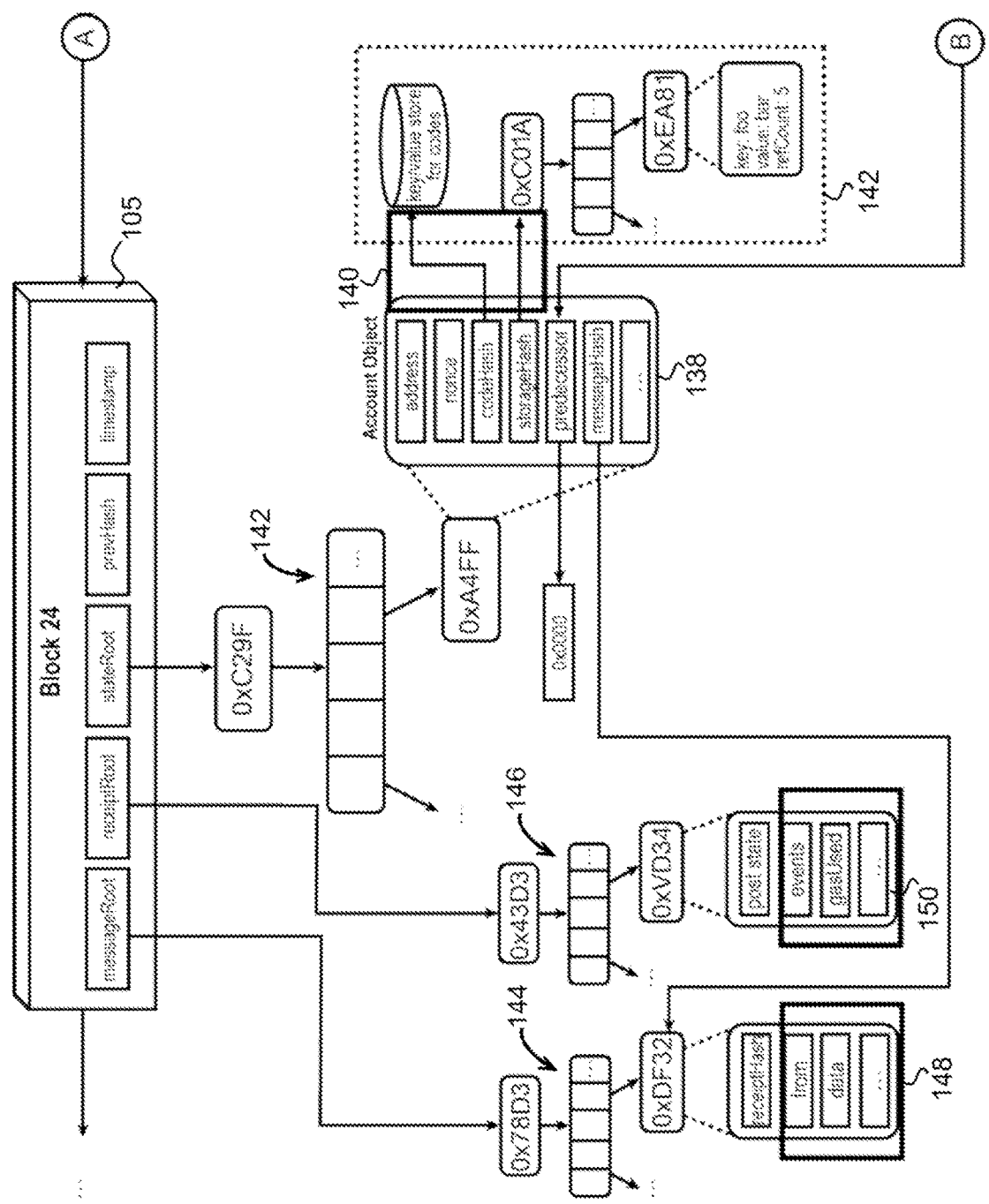

FIGS. 3A and 3B are block diagrams illustrating an example of a partition of a tamper-evident data store. In some cases, a tamper-evident data store may include several such partitions. In some embodiments, the tamper-evident data store may be a distributed ledger, like one or more blockchains, such as those of the above-described blockchain-based computing platforms. FIGS. 3A and 3B depict a sequence of blocks in a blockchain and related tries of cryptographic hash pointers having root hashes stored in those respective blocks. The illustrated arrows correspond to pointers (e.g., cryptographic hash), and the letters with circles labeled A and B illustrate where the two data structures are joined by cryptographic hash pointers or other pointers. In the illustrated example, the blocks are consecutive, but in many commercial embodiments, it is expected that data from invocation of a given smart contract may skip several blocks between invocation. In the illustrated example, a tamper-evident data store 102 includes a linked list of blocks 104 and 105 connected by cryptographic hash pointers. In this example, the block 104 may be created later in time than the block 105.

In some embodiments, the data store 102 may be characterized as a directed acyclic graph of cryptographic hash pointers. A subset of nodes of the directed acyclic graph may form a linked list or skip list, such as those nodes labeled as blocks 104 and 105. In some embodiments, each node of this list may include as content a plurality of values, including a timestamp of when the respective block was created, a cryptographic hash of content of the previous node pointed to by an edge connecting those nodes 108, a root value 110 of a trie of cryptographic hash values referred to as a state trie 118, a cryptographic hash 112 that is a root value of a trie 124 of cryptographic hash values referred to as a receipt trie, and a cryptographic hash value 114 that is a root value of a trie of cryptographic hash values referred to as a transaction trie 122. In some embodiments, each block 104 and 105 may have three or more tries directly connected thereto by cryptographic hash pointers corresponding to root values of respective tries a cryptographic hash values, for example, Merkle roots.

In some embodiments, the state trie 118 may include a plurality of levels of cryptographic hash pointers that fan out from a root to leaf nodes through 2, 3, 4, 5, 6, or more hierarchical levels of branching. In some embodiments, leaf nodes may each correspond to an account address of a smart contract or instance of invocation thereof. In some embodiments, such leaf nodes (or paths thereto) of the state trie 118 may include the fields 126 shown in FIG. 3A. The address may be an address of the smart contract or instance of invocation, the nonce value may be a count of the number of times the smart contract has been invoked, the code hash value may be a cryptographic hash of bytecode representation of the smart contract 130, the storage hash may be a Merkle root of a trie of cryptographic hash pointers 120 storing key-value pairs encoding program state of the smart contract that is ephemeral between instances of invocation. In some embodiments, the fields include a predecessor pointer that points to a previous entry in an entry in an earlier state trie corresponding to a previous invocation of the smart contract and a cryptographic hash of a transaction in which the smart contract was invoked, which may be an address of an entry in the transaction trie 122.

In some embodiments, the transaction trie 122 similarly includes a plurality of levels of cryptographic hash pointers that fan out from a root node to leaf nodes, paths to which corresponding to individual transactions by which smart contracts are invoked or deployed. Leaf nodes may include is content a plurality of fields, including a cryptographic hash value of an entry in the receipt trie 124 corresponding to a record documenting consumption of a cryptographic tokens by which usage of computation of the decentralized computing platform are metered, such as gas in Ethereum or any other suitable technique for metering usage or any combination thereof. In some embodiments, the entry corresponding to the transaction trie leaf node further includes a from field indicating an address or other identifier of an entity from which the transaction was sent and data specifying the transaction, for example, indicating which subroutine is invoked and arguments thereof, along with an address of the smart contract being invoked.

Some embodiments include the entries 132 including the entry indicating who issued the transaction. In some embodiments, the receipt hash of the entry in the transaction trie 122 may identify a set of nodes along a path in the receipt trie 124 documenting consumption of a cryptographic token attributable to the corresponding transaction.

In some embodiments, entries in the state trie of a given block may include pointers to previous entries corresponding to previous invocations of a given smart contract, as connected by the circle with the letter B between FIGS. 3A and 3B. In some embodiments, the predecessor pointer may identify entry 138 in earlier block 105's state trie. In this example, the predecessor entry for leaf node 138 points to an empty address, indicating the end of a sequence and the initial deployment of the smart contract to the decentralized computing platform. The block may link to a similar set of tries 142, 146, and 144, corresponding to a state trie, a receipt trie, and a transaction trie respectively like those discussed above.

Figure 4:
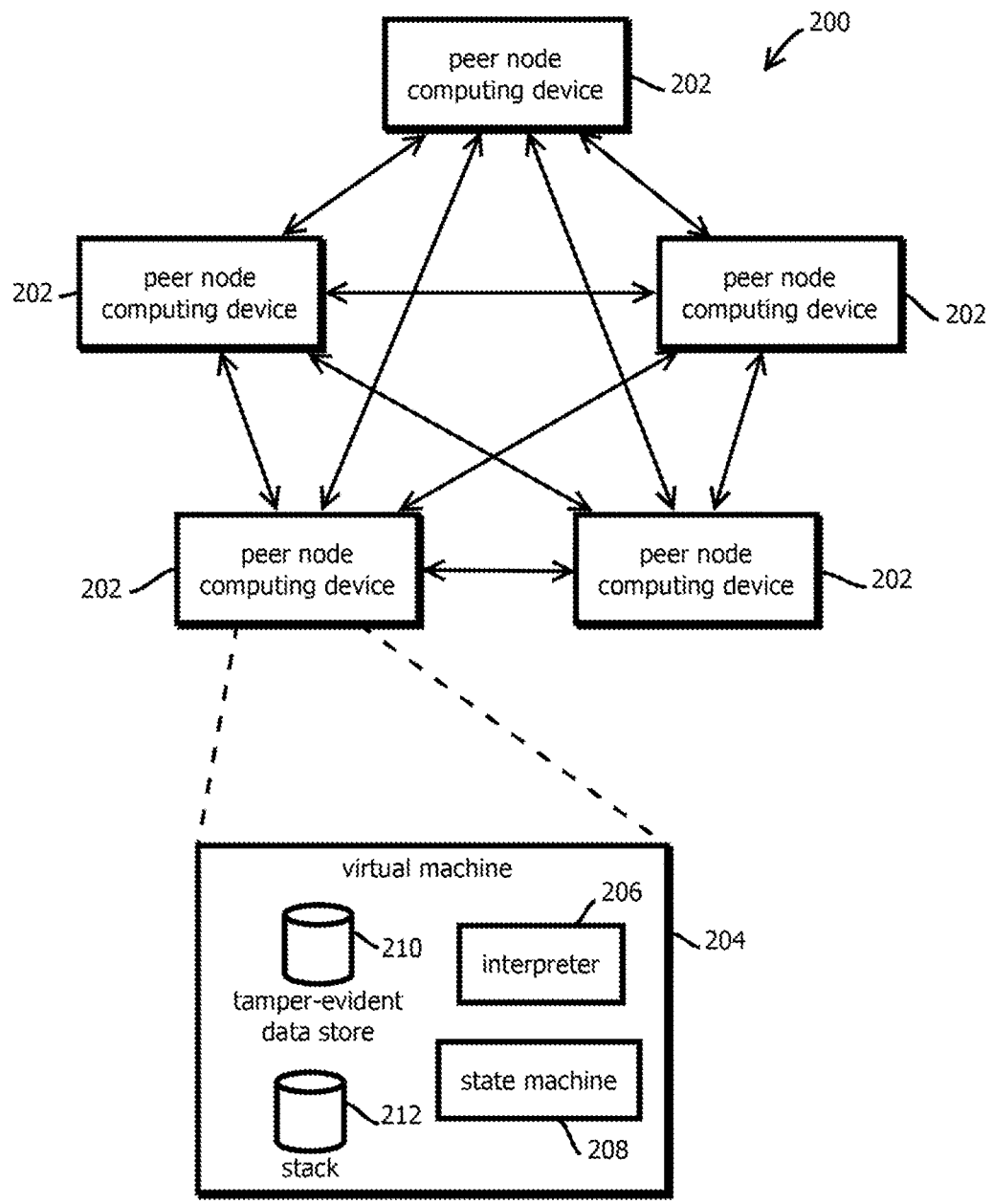
FIG. 4 is a physical and logical architecture block diagram of an example of a decentralized computing platform in which the data store of FIGS. 3A and 3B and processes of FIGS. 1 and 2 may be implemented, in accordance with some embodiments of the present techniques.

FIG. 4 illustrates an example physical and logical architecture of a decentralized computing platform 200. In some embodiments, there may be no centralized authority exercising control of the computing platform, and computing may be implemented through ad hoc cooperation of a plurality of different peer computing node applications 202 executing on different computing devices, or in some cases, a plurality of different peer node applications may execute on a single computing device, for example, in different virtual machines or containers. In some embodiments, the decentralized computing platform 200 is a permissionless (e.g., public) computing platform in which anyone with access to program code of the peer node application may participate by installing and executing the application. In some embodiments, the decentralized computing platform may be a private decentralized computing platform, such as one in which peer computing nodes authenticate themselves to the other computing nodes by demonstrating possession of a private cryptographic key associated with a permissioned tenant of the blockchain computing platform 200. Five peer computing nodes 200 are shown, but commercial embodiments are expected to include substantially more, for instance, more than 10, more than 100, or more than 1000. In some embodiments, a plurality of tenants may have authentication credentials entitling their peer nodes to participate, such as more than 2, more than 5, more than 10, or more than 100 tenants. In some embodiments, peer computing nodes may be co-located or geographically distributed, for instance, executing on different data centers or different on-premises collections of computing hardware.

In some cases, different subsets of the peer nodes 202 may have different roles and permissions. In some cases, some of the peer nodes 202 may operate as validators having access to, for instance, all of the data in a domain like those described below with reference to FIG. 5. In some cases, validator peer nodes may participate in consensus determinations and execute smart contracts. Observer peer nodes may have fewer privileges, e.g., the right to access data in a domain (or other type of partition) or subspace (or other type of sub-partition), without participating in consensus or executing smart contracts. In some cases, a given peer node 202 may be a validator in one domain and an observer in another.

In some embodiments, each peer computing node 200 may execute an instance of a virtual machine 204, such as the Ethereum virtual machine, the eWASM (Ethereum web assembly) virtual machine, various other suitable virtual machines (e.g., the Java™ virtual machine), or various combinations of virtual machines. In some embodiments, the virtual machine is operative to execute bytecode encoding a set of opcodes of the virtual machine. In some cases, smart contracts written in source code may be interpreted to bytecode, which the virtual machine 204 may then compile to machine code suitable for the underlying computing hardware, abstracting away differences in processors and other hardware from developers. In some embodiments, the virtual machine 204 may be identical on each of the peer computing nodes 202. In some embodiments, the virtual machine may include an interpreter 206 configured to interpret source code into bytecode, a state machine 208 configured to execute smart contracts and update state of the smart contract stored in a tamper-evident data store 210. In some embodiments, some ephemeral state of the smart contracts during execution may be stored in a stack data structure 212 of the virtual machine 204, and other ephemeral state may be stored in random access memory allocated by the virtual machine to the smart contract's process. In some cases, different opcodes may have different has costs allocated thereto by the virtual machine, which may tally gas costs of execution and update records in the receipts trie to indicate gas consumption. In some embodiments, the virtual machine 204 may be configured to respond to an opcode corresponding to cross-partition or cross-sub-partition call, like those discussed above.

FIG. 5 depicts an example of a privacy and permissioning data model that may be implemented with the above-described data stores and decentralized computing platforms. In some embodiments, different peer nodes have different roles, and some cases with some peer nodes being responsible for determining consensus, will and other peer nodes merely being able to interrogate the results of computations. In some embodiments, a subset of the peer nodes (like validator nodes) may govern access of various forms by other nodes (like observer nodes) to the data stored in the decentralized computing platform. In some embodiments, roles and permissions of various tenants and user accounts therein may be mapped to different domains 232 and different sub spaces 234 therein, such that a given tenant or given user of a given tenant may be permitted to engage in, or prevented from, reading, writing, or pruning entries in a given domain 232 or subspace 234 thereof. In some embodiments, the domain 232 and subspace mappings 234 may be overlaid on the same tamper-evident data structure, such that different entities may have different types of access to different subsets of that data structure. Or in some cases, privacy and access control may be implemented with other data models, like channels in Hyperledger implementations.

Figure 6:
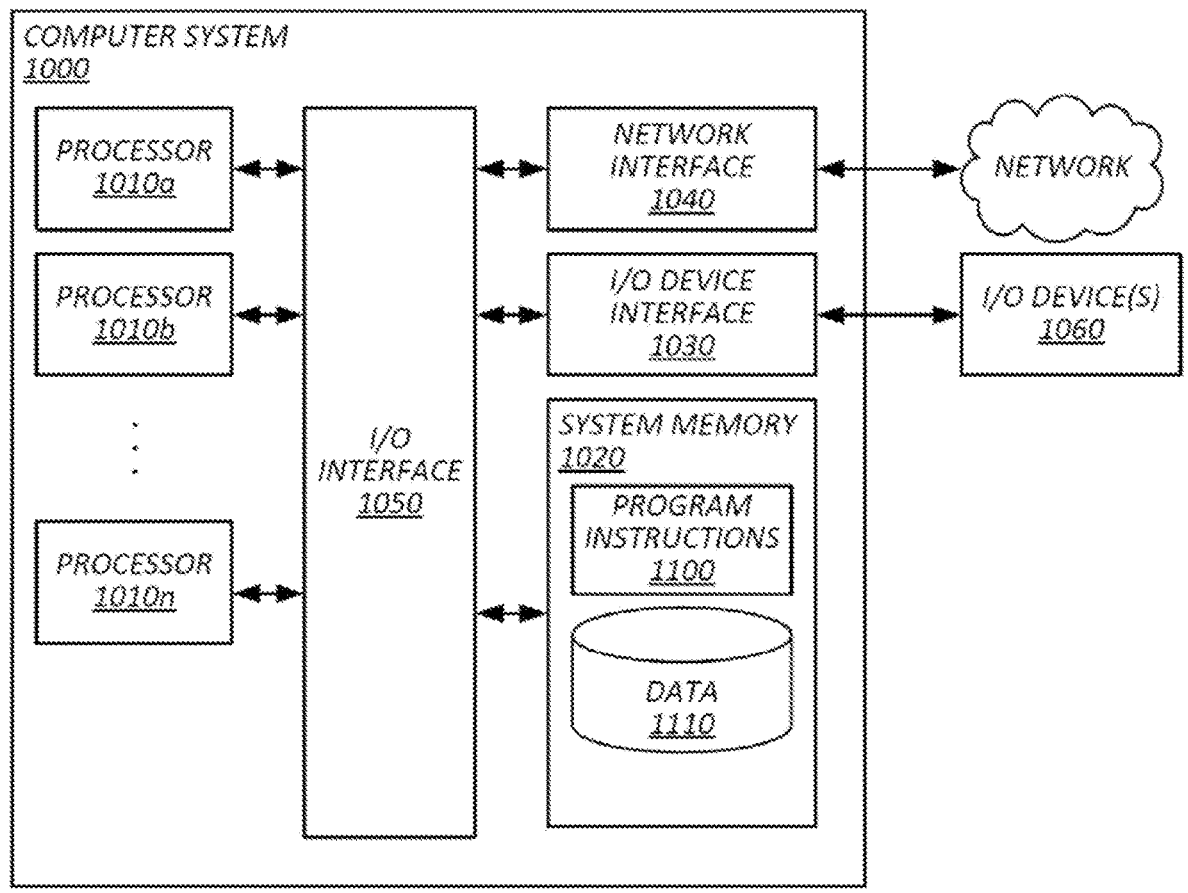
FIG. 6 is a block diagram depicting an example of a computing device by which the above techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C") refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with a computer system, a first request by a first program associated with a first sub-partition of a first partition of a tamper-evident data store of a decentralized computing platform to read data stored in either (i) a second sub-partition of the first partition of the tamper-evident data store of the decentralized computing platform, or (ii) a second partition of the tamper-evident data store of the decentralized computing platform, wherein: the tamper-evident data store comprises a plurality of partitions, including the first partition and the second partition, each of the plurality of partitions corresponding to a different directed acyclic graph of cryptographic hash pointers, the decentralized computing platform is configured to associate programs executed on the decentralized computing platform with partitions and sub-partitions of partitions, the decentralized computing platform is configured to prevent programs from reading data in sub-partitions or partitions with which the programs are not associated, and programs executable on the decentralized computing platform are authorized to write program state to the sub-partitions and partitions with which respective programs are associated; determining, with the computer system, with a subset of peer computing nodes of a set of peer computing nodes upon which the decentralized computing platform executes, that the first program is authorized to read from the second sub-partition or the second partition; and in response to the determination, causing, with the computer system, the requested data to be read from the second sub-partition or the second partition and provided to the first program.

2. The medium of embodiment 1, wherein: the first request is a request to read data stored in the second sub-partition of the first partition of the tamper-evident data store of the decentralized computing platform; and determining that the first program is authorized to read from the second sub-partition or the second partition comprises determining that the first program is authorized to read from the second sub-partition.

3. The medium of embodiment 1, wherein: the first request is a request to read data stored in the second partition of the tamper-evident data store of the decentralized computing platform; and determining that the first program is authorized to read from the second partition or the second partition comprises determining that the first program is authorized to read from the second partition.

4. The medium of embodiment 3, wherein: the first request is a request to read data stored in a third sub-partition of the second partition; and determining that the first program is authorized to read from the second partition comprises determining that the first program is authorized to read from the third sub-partition.

5. The medium of embodiment 3, wherein: causing the requested data to be read comprises obtaining an identifier of a most recent data node determined to have been added to the directed acyclic graph of cryptographic hash pointers corresponding to the second partition, the identifier distinguishing the most recent data node from other data nodes of the directed acyclic graph of cryptographic hash pointers corresponding to the second partition; and storing the identifier in association with the requested data in the first partition.

6. The medium of embodiment 5, wherein obtaining the identifier of the most recent data node determined to have been added to the added to the directed acyclic graph of cryptographic hash pointers corresponding to the second partition comprises: querying a subset of peer computing nodes of the decentralized computing platform that determine consensus regarding state of the second partition with a query requesting a respective most recent data node determined by the respective peer computing nodes to have been added to the determined to have been added to the directed acyclic graph of cryptographic hash pointers corresponding to the second partition; and determining the most recent data node based on a plurality of query responses of the subset of peer computing nodes of the decentralized computing platform that determine consensus regarding state of the second partition.

7. The medium of embodiment 6, wherein determining the most recent data node based on the plurality of query responses comprises: determining that a first subset of peer computing nodes have determined that a first data node is the most recent data node; determining that a second subset of peer computing nodes have determined that a second data node is the most recent data node; and obtaining a first value associated with the first data node indicating a sequence with which data nodes are added to the directed acyclic graph of cryptographic hash pointers corresponding to the second partition; obtaining a second value associated with the second data node indicating the sequence with which data nodes are added to the directed acyclic graph of cryptographic hash pointers corresponding to the second partition; and determining, based on a comparison of the first value and the second value, that the second data node was added to the directed acyclic graph of cryptographic hash pointers corresponding to the second partition before the first data node and, in response, selecting the second data node as the most recent data node and causing the requested data to be read from the second data node.

8. The medium of embodiment 5, wherein obtaining the identifier of the most recent data node determined to have been added to the directed acyclic graph of cryptographic hash pointers corresponding to the second partition comprises: obtaining an identifier of a data node that all peer computing nodes of the decentralized computing platform that determine consensus regarding state of the second partition agree has been added to the been added to the directed acyclic graph of cryptographic hash pointers corresponding to the second partition and, in response, causing the requested data to be read from the identified data node that all peer computing nodes of the decentralized computing platform that determine consensus regarding state of the second partition agree has been added to the been added to the directed acyclic graph of cryptographic hash pointers corresponding to the second partition.

9. The medium of any one of embodiments 1-8, wherein the operations further comprise executing, with the decentralized computing platform, the first program associated with the first sub-partition; and executing, with the decentralized computing platform, concurrently with executing the first program, a second program associated with the second sub-partition.

10. The medium of any one of embodiments 1-9, wherein: peer computing nodes of the decentralized computing platform have one or more roles in a set of roles; roles in the set of roles are in relation to partitions or sub-partitions; the set of roles include a validator role and an observer role; peer computing nodes holding the validator role are permitted, by the decentralized computing platform, to determine consensus regarding state of partitions or sub-partitions in relation to which the validator role is held; and peer computing nodes holding the observer role are permitted, by the decentralized computing platform, to read state of partitions or sub-partitions in relation to which the observer role is held.

11. The medium of embodiment 10, wherein: peer computing nodes holding the validator role are permitted, by the decentralized computing platform, to determine consensus regarding state of sub-partitions in relation to which the validator role is held by executing programs associated with sub-partitions in relation to which the validator role is held.

12. The medium of embodiment 10, wherein: a first peer computing node of the decentralized computing platform holds the validator role in relation to the first sub-partition; the first peer computing node executes the first program; the first peer computing node of the decentralized computing platform holds the observer role in relation to the second sub-partition or the second partition; and the first peer computing node reads the requested data.

13. The medium of embodiment 12, wherein: a second peer computing node of the decentralized computing platform holds the validator role in relation to the first sub-partition; the second peer computing node executes the first program; and executing the first program comprises determining a consensus output of the first program based on both output of executing the first program by the first peer computing node and output of executing the first program by the second peer computing node.

14. The medium of any one of embodiments 1-13, wherein the first program obtains the requested data by calling a second program associated with a shared sub-partition, the second program and data stored in the shared sub-partition being accessible to programs associated with a plurality of different sub-partitions of the first partition.

15. The medium of any one of embodiments 1-14, wherein the operations further comprise: detecting, with a virtual machine executed by a peer computing node of the decentralized computing platform, an opcode in a bytecode representation of the first program, wherein the virtual machine has an identifier in memory identifying a state trie from which program state is read, the state trie being part of the directed acyclic graph of cryptographic hash pointers corresponding to the first partition; in response to detecting the opcode, determining, with the virtual machine, that the opcode or an argument of the opcode indicates the request is to read data from the second partition; and in response to determining that the opcode or argument of the opcode indicates the request is to read data from the second partition, changing the identifier to identify another statue trie that is part of the directed acyclic graph of cryptographic hash pointers corresponding to the second partition.

16. The medium of any one of embodiments 1-15, wherein: the requested data is data published by a data publisher; and determining that the first program is authorized to read from the second sub-partition or the second partition comprises determining that an entity that deployed the first program has a subscription to data published by the data publisher.

17. The medium of embodiment 16, wherein: the data publisher is a market-data provider; and the first program is a smart contract having logic that computes an output of the first program based on a current state of market data published by the market-data provider.

18. The medium of embodiment 1, the operations further comprising: obtaining a second request by a second program associated with the first sub-partition of the first partition of the tamper-evident data store of the decentralized computing platform to read data stored in either (i) the second sub-partition of the first partition of the tamper-evident data store of the decentralized computing platform, or (ii) the second partition of the tamper-evident data store of the decentralized computing platform; determining, with the subset of peer computing nodes of the set of peer computing nodes upon which the decentralized computing platform executes, that the second program is not authorized to read from the second sub-partition or the second partition; and in response to the determination, preventing the requested data from being provided to the second program.

19. A method, comprising: the operations of any one of embodiments 1-18.

20. A system, comprising: one or more processors; and memory storing instructions that when executed by the processors cause the processors to effectuate operations comprising: the operations of any one of embodiments 1-18.

What is claimed is:

1. A tangible, non-transitory, machine-readable medium storing instructions that when executed by one or more processors effectuate operations comprising:
    obtaining, with a computer system, a first request by a first program associated with a first sub-partition of a first partition of a tamper-evident data store of a decentralized computing platform to read data stored in either (i) a second sub-partition of the first partition of the tamper-evident data store of the decentralized computing platform, or (ii) a second partition of the tamper-evident data store of the decentralized computing platform, wherein:
        the tamper-evident data store comprises a plurality of partitions, including the first partition and the second partition, each of the plurality of partitions corresponding to a different directed acyclic graph of cryptographic hash pointers,
        the decentralized computing platform is configured to associate programs executed on the decentralized computing platform with partitions and sub-partitions of partitions,
        the decentralized computing platform is configured to prevent programs from reading data in sub-partitions or partitions with which the programs are not associated, and
        programs executable on the decentralized computing platform are authorized to write program state to the sub-partitions and partitions with which respective programs are associated;
    determining, with the computer system, with a subset of peer computing nodes of a set of peer computing nodes upon which the decentralized computing platform executes, that the first program is authorized to read from the second sub-partition or the second partition; and
    in response to the determination, causing, with the computer system, the requested data to be read from the second sub-partition or the second partition and provided to the first program.

2. The medium of claim 1, wherein:
    the first request is a request to read data stored in the second sub-partition of the first partition of the tamper-evident data store of the decentralized computing platform; and
    determining that the first program is authorized to read from the second sub-partition or the second partition comprises determining that the first program is authorized to read from the second sub-partition.

3. The medium of claim 1, wherein:
    the first request is a request to read data stored in the second partition of the tamper-evident data store of the decentralized computing platform; and
    determining that the first program is authorized to read from the second partition or the second partition comprises determining that the first program is authorized to read from the second partition.

4. The medium of claim 3, wherein:
    the first request is a request to read data stored in a third sub-partition of the second partition; and
    determining that the first program is authorized to read from the second partition comprises determining that the first program is authorized to read from the third sub-partition.

5. The medium of claim 3, wherein:
    causing the requested data to be read comprises obtaining an identifier of a most recent data node determined to have been added to the directed acyclic graph of cryptographic hash pointers corresponding to the second partition, the identifier distinguishing the most recent data node from other data nodes of the directed acyclic graph of cryptographic hash pointers corresponding to the second partition; and
    storing the identifier in association with the requested data in the first partition.

6. The medium of claim 5, wherein obtaining the identifier of the most recent data node determined to have been added to the added to the directed acyclic graph of cryptographic hash pointers corresponding to the second partition comprises:
    querying a subset of peer computing nodes of the decentralized computing platform that determine consensus regarding state of the second partition with a query requesting a respective most recent data node determined by the respective peer computing nodes to have been added to the determined to have been added to the directed acyclic graph of cryptographic hash pointers corresponding to the second partition; and
    determining the most recent data node based on a plurality of query responses of the subset of peer computing nodes of the decentralized computing platform that determine consensus regarding state of the second partition.

7. The medium of claim 6, wherein determining the most recent data node based on the plurality of query responses comprises:
    determining that a first subset of peer computing nodes have determined that a first data node is the most recent data node;
    determining that a second subset of peer computing nodes have determined that a second data node is the most recent data node; and obtaining a first value associated with the first data node indicating a sequence with which data nodes are added to the directed acyclic graph of cryptographic hash pointers corresponding to the second partition;

obtaining a second value associated with the second data node indicating the sequence with which data nodes are added to the directed acyclic graph of cryptographic hash pointers corresponding to the second partition; and determining, based on a comparison of the first value and the second value, that the second data node was added to the directed acyclic graph of cryptographic hash pointers corresponding to the second partition before the first data node and, in response, selecting the second data node as the most recent data node and causing the requested data to be read from the second data node.

8. The medium of claim 5, wherein obtaining the identifier of the most recent data node determined to have been added to the directed acyclic graph of cryptographic hash pointers corresponding to the second partition comprises:

obtaining an identifier of a data node that all peer computing nodes of the decentralized computing platform that determine consensus regarding state of the second partition agree has been added to the been added to the directed acyclic graph of cryptographic hash pointers corresponding to the second partition and, in response, causing the requested data to be read from the identified data node that all peer computing nodes of the decentralized computing platform that determine consensus regarding state of the second partition agree has been added to the been added to the directed acyclic graph of cryptographic hash pointers corresponding to the second partition.

9. The medium of claim 1, wherein the operations further comprise:

executing, with the decentralized computing platform, the first program associated with the first sub-partition; and executing, with the decentralized computing platform, concurrently with executing the first program, a second program associated with the second sub-partition.

10. The medium of claim 1, wherein:

peer computing nodes of the decentralized computing platform have one or more roles in a set of roles;

roles in the set of roles are in relation to partitions or sub-partitions;

the set of roles include a validator role and an observer role;

peer computing nodes holding the validator role are permitted, by the decentralized computing platform, to determine consensus regarding state of partitions or sub-partitions in relation to which the validator role is held; and peer computing nodes holding the observer role are permitted, by the decentralized computing platform, to read state of partitions or sub-partitions in relation to which the observer role is held.

11. The medium of claim 10, wherein:

peer computing nodes holding the validator role are permitted, by the decentralized computing platform, to determine consensus regarding state of sub-partitions in relation to which the validator role is held by executing programs associated with sub-partitions in relation to which the validator role is held.

12. The medium of claim 10, wherein:

a first peer computing node of the decentralized computing platform holds the validator role in relation to the first sub-partition;

the first peer computing node executes the first program;

the first peer computing node of the decentralized computing platform holds the observer role in relation to the second sub-partition or the second partition; and the first peer computing node reads the requested data.

13. The medium of claim 12, wherein:

a second peer computing node of the decentralized computing platform holds the validator role in relation to the first sub-partition;

the second peer computing node executes the first program; and executing the first program comprises determining a consensus output of the first program based on both output of executing the first program by the first peer computing node and output of executing the first program by the second peer computing node.

14. The medium of claim 1, wherein the first program obtains the requested data by calling a second program associated with a shared sub-partition, the second program and data stored in the shared sub-partition being accessible to programs associated with a plurality of different sub-partitions of the first partition.

15. The medium of claim 1, wherein the operations further comprise:

detecting, with a virtual machine executed by a peer computing node of the decentralized computing platform, an opcode in a bytecode representation of the first program, wherein the virtual machine has an identifier in memory identifying a state trie from which program state is read, the state trie being part of the directed acyclic graph of cryptographic hash pointers corresponding to the first partition;

in response to detecting the opcode, determining, with the virtual machine, that the opcode or an argument of the opcode indicates the request is to read data from the second partition; and in response to determining that the opcode or argument of the opcode indicates the request is to read data from the second partition, changing the identifier to identify another statue trie that is part of the directed acyclic graph of cryptographic hash pointers corresponding to the second partition.

16. The medium of claim 1, wherein the operations further comprise:

steps for making cross-partition calls by smart contracts.

17. The medium of claim 1, wherein the operations further comprise:

obtaining a second request by a second program associated with the first sub-partition of the first partition of the tamper-evident data store of the decentralized computing platform to read data stored in either (i) the second sub-partition of the first partition of the tamper-evident data store of the decentralized computing platform, or (ii) the second partition of the tamper-evident data store of the decentralized computing platform;

determining, with the subset of peer computing nodes of the set of peer computing nodes upon which the decentralized computing platform executes, that the second program is not authorized to read from the second sub-partition or the second partition; and in response to the determination, preventing the requested data from being provided to the second program.

18. The medium of claim 1, wherein:

the requested data is data published by a data publisher; and determining that the first program is authorized to read from the second sub-partition or the second partition comprises determining that an entity that deployed the first program has a subscription to data published by the data publisher.

19. The medium of claim 18, wherein:
the data publisher is a market-data provider; and
the first program is a smart contract having logic that computes an output of the first program based on a current state of market data published by the market-data provider.

20. A method, comprising:
obtaining, with a computer system, a first request by a first program associated with a first sub-partition of a first partition of a tamper-evident data store of a decentralized computing platform to read data stored in either (i) a second sub-partition of the first partition of the tamper-evident data store of the decentralized computing platform, or (ii) a second partition of the tamper-evident data store of the decentralized computing platform, wherein:
  the tamper-evident data store comprises a plurality of partitions, including the first partition and the second partition, each of the plurality of partitions corresponding to a different directed acyclic graph of cryptographic hash pointers,
  the decentralized computing platform is configured to associate programs executed on the decentralized computing platform with partitions and sub-partitions of partitions,
  the decentralized computing platform is configured to prevent programs from reading data in sub-partitions or partitions with which the programs are not associated, and
  programs executable on the decentralized computing platform are authorized to write program state to the sub-partitions and partitions with which respective programs are associated;
determining, with the computer system, with a subset of peer computing nodes of a set of peer computing nodes upon which the decentralized computing platform executes, that the first program is authorized to read from the second sub-partition or the second partition; and
in response to the determination, causing, with the computer system, the requested data to be read from the second sub-partition or the second partition and provided to the first program.

21. The method of claim 20, wherein:
the first request is a request to read data stored in the second sub-partition of the first partition of the tamper-evident data store of the decentralized computing platform; and
determining that the first program is authorized to read from the second sub-partition or the second partition comprises determining that the first program is authorized to read from the second sub-partition.

22. The method of claim 20, wherein:
the first request is a request to read data stored in the second partition of the tamper-evident data store of the decentralized computing platform; and
determining that the first program is authorized to read from the second partition or the second partition comprises determining that the first program is authorized to read from the second partition.

23. The method of claim 22, wherein:
the first request is a request to read data stored in a third sub-partition of the second partition; and
determining that the first program is authorized to read from the second partition comprises determining that the first program is authorized to read from the third sub-partition.

24. The method of claim 22, wherein:
causing the requested data to be read comprises obtaining an identifier of a most recent data node determined to have been added to the directed acyclic graph of cryptographic hash pointers corresponding to the second partition, the identifier distinguishing the most recent data node from other data nodes of the directed acyclic graph of cryptographic hash pointers corresponding to the second partition; and
storing the identifier in association with the requested data in the first partition.

25. The method of claim 24, wherein obtaining the identifier of the most recent data node determined to have been added to the added to the directed acyclic graph of cryptographic hash pointers corresponding to the second partition comprises:
querying a subset of peer computing nodes of the decentralized computing platform that determine consensus regarding state of the second partition with a query requesting a respective most recent data node determined by the respective peer computing nodes to have been added to the determined to have been added to the directed acyclic graph of cryptographic hash pointers corresponding to the second partition; and
determining the most recent data node based on a plurality of query responses of the subset of peer computing nodes of the decentralized computing platform that determine consensus regarding state of the second partition.

26. The method of claim 25, wherein determining the most recent data node based on the plurality of query responses comprises:
determining that a first subset of peer computing nodes have determined that a first data node is the most recent data node;
determining that a second subset of peer computing nodes have determined that a second data node is the most recent data node; and
obtaining a first value associated with the first data node indicating a sequence with which data nodes are added to the directed acyclic graph of cryptographic hash pointers corresponding to the second partition;
obtaining a second value associated with the second data node indicating the sequence with which data nodes are added to the directed acyclic graph of cryptographic hash pointers corresponding to the second partition; and
determining, based on a comparison of the first value and the second value, that the second data node was added to the directed acyclic graph of cryptographic hash pointers corresponding to the second partition before the first data node and, in response, selecting the second data node as the most recent data node and causing the requested data to be read from the second data node.

27. The method of claim 24, wherein obtaining the identifier of the most recent data node determined to have been added to the directed acyclic graph of cryptographic hash pointers corresponding to the second partition comprises:
obtaining an identifier of a data node that all peer computing nodes of the decentralized computing platform that determine consensus regarding state of the second partition agree has been added to the been added to the directed acyclic graph of cryptographic hash pointers corresponding to the second partition and, in response, causing the requested data to be read from the identified data node that all peer computing nodes of the decentralized computing platform that determine consensus regarding state of the second partition agree has been added to the been added to the directed acyclic graph of cryptographic hash pointers corresponding to the second partition.

28. The method of claim 20, further comprising:
executing, with the decentralized computing platform, the first program associated with the first sub-partition; and
executing, with the decentralized computing platform, concurrently with executing the first program, a second program associated with the second sub-partition.

29. The method of claim 20, wherein:
peer computing nodes of the decentralized computing platform have one or more roles in a set of roles;
roles in the set of roles are in relation to partitions or sub-partitions;
the set of roles include a validator role and an observer role;
peer computing nodes holding the validator role are permitted, by the decentralized computing platform, to determine consensus regarding state of partitions or sub-partitions in relation to which the validator role is held; and
peer computing nodes holding the observer role are permitted, by the decentralized computing platform, to read state of partitions or sub-partitions in relation to which the observer role is held.

30. The method of claim 29, wherein:
peer computing nodes holding the validator role are permitted, by the decentralized computing platform, to determine consensus regarding state of sub-partitions in relation to which the validator role is held by executing programs associated with sub-partitions in relation to which the validator role is held.

31. The method of claim 29, wherein:
a first peer computing node of the decentralized computing platform holds the validator role in relation to the first sub-partition;
the first peer computing node executes the first program;
the first peer computing node of the decentralized computing platform holds the observer role in relation to the second sub-partition or the second partition; and
the first peer computing node reads the requested data.

32. The method of claim 31, wherein:
a second peer computing node of the decentralized computing platform holds the validator role in relation to the first sub-partition;
the second peer computing node executes the first program; and
executing the first program comprises determining a consensus output of the first program based on both output of executing the first program by the first peer computing node and output of executing the first program by the second peer computing node.

33. The method of claim 20, wherein the first program obtains the requested data by calling a second program associated with a shared sub-partition, the second program and data stored in the shared sub-partition being accessible to programs associated with a plurality of different sub-partitions of the first partition.

34. The method of claim 20, further comprising:
detecting, with a virtual machine executed by a peer computing node of the decentralized computing platform, an opcode in a bytecode representation of the first program, wherein the virtual machine has an identifier in memory identifying a state trie from which program state is read, the state trie being part of the directed acyclic graph of cryptographic hash pointers corresponding to the first partition;
in response to detecting the opcode, determining, with the virtual machine, that the opcode or an argument of the opcode indicates the request is to read data from the second partition; and
in response to determining that the opcode or argument of the opcode indicates the request is to read data from the second partition, changing the identifier to identify another statue trie that is part of the directed acyclic graph of cryptographic hash pointers corresponding to the second partition.

35. The method of claim 20, further comprising:
steps for making cross-partition calls by smart contracts.

36. The method of claim 20, further comprising:
obtaining a second request by a second program associated with the first sub-partition of the first partition of the tamper-evident data store of the decentralized computing platform to read data stored in either (i) the second sub-partition of the first partition of the tamper-evident data store of the decentralized computing platform, or (ii) the second partition of the tamper-evident data store of the decentralized computing platform;
determining, with the subset of peer computing nodes of the set of peer computing nodes upon which the decentralized computing platform executes, that the second program is not authorized to read from the second sub-partition or the second partition; and
in response to the determination, preventing the requested data from being provided to the second program.

37. The method of claim 20, wherein:
the requested data is data published by a data publisher; and
determining that the first program is authorized to read from the second sub-partition or the second partition comprises determining that an entity that deployed the first program has a subscription to data published by the data publisher.

38. The method of claim 37, wherein:
the data publisher is a market-data provider; and
the first program is a smart contract having logic that computes an output of the first program based on a current state of market data published by the market-data provider.

* * * * *